United States Patent
Bordelon et al.

(10) Patent No.: US 9,637,871 B2
(45) Date of Patent: May 2, 2017

(54) LOAD-SUPPORTING SURFACE WITH ACTIVELY CONNECTED GAP SEALS AND RELATED APPARATUS AND METHODS

(71) Applicant: NEWPARK MATS & INTEGRATED SERVICES LLC, The Woodlands, TX (US)

(72) Inventors: Randy Paul Bordelon, Opelousas, LA (US); Richard Lamar Edwards, Jr., Lafayette, LA (US); James Kerwin McDowell, Lafayette, LA (US)

(73) Assignee: Newpark Mats & Integrated Services LLC, The Woodlands, TX (US)

( * ) Notice: Subject to any disclaimer, the term of this patent is extended or adjusted under 35 U.S.C. 154(b) by 69 days.

(21) Appl. No.: 14/730,938

(22) Filed: Jun. 4, 2015

(65) Prior Publication Data

US 2016/0017547 A1   Jan. 21, 2016

Related U.S. Application Data

(60) Provisional application No. 62/013,899, filed on Jun. 18, 2014.

(51) Int. Cl.
| | | |
|---|---|---|
| *E01C 11/00* | (2006.01) | |
| *E01C 11/02* | (2006.01) | |
| *E01C 5/00* | (2006.01) | |
| *E01C 9/08* | (2006.01) | |
| *B29D 99/00* | (2010.01) | |
| *B65D 90/24* | (2006.01) | |
| *E02D 31/00* | (2006.01) | |
| *B29K 101/12* | (2006.01) | |

(52) U.S. Cl.
CPC .......... *E01C 11/02* (2013.01); *B29D 99/0057* (2013.01); *B65D 90/24* (2013.01); *E01C 5/003* (2013.01); *E01C 5/005* (2013.01); *E01C 9/086* (2013.01); *E02D 31/002* (2013.01); *B29K 2101/12* (2013.01)

(58) Field of Classification Search
CPC .......... E01C 11/02; E01C 5/003; E01C 5/005; E01C 9/086; B29D 99/0057; B29K 2101/12; B65D 90/24; E02D 31/002
USPC ...................... 404/34–36, 40, 47, 72, 73, 74
See application file for complete search history.

(56) References Cited

U.S. PATENT DOCUMENTS

| | | |
|---|---|---|
| 3,411,260 A | 11/1968 | Dill |
| 3,521,528 A | 7/1970 | Wangerow |
| | (Continued) | |

FOREIGN PATENT DOCUMENTS

| | | |
|---|---|---|
| DE | 1251933 | 10/1967 |
| DE | 8531020 U1 | 2/1986 |
| | (Continued) | |

OTHER PUBLICATIONS

"DURA-BASE Composite Mat System", Newpark Mats & Integrated Services, 8 pp.

*Primary Examiner* — Raymond W Addie
(74) *Attorney, Agent, or Firm* — E. Randall Smith; E. Randall Smith, P.C.

(57) ABSTRACT

Apparatus for forming a liquid-tight seal across gaps formed between adjacent components of a load-supporting surface useful at an outdoor worksite includes a liquid-impermeable, elongated, seal member configured to be sealing coupled to first and second mats in the load-supporting surface and extend across the gap formed therebetween.

28 Claims, 10 Drawing Sheets

(56) References Cited

U.S. PATENT DOCUMENTS

| | | | | |
|---|---|---|---|---|
| 3,614,915 A | * | 10/1971 | Perry | E01C 9/083 |
| | | | | 404/40 |
| 3,732,788 A | | 5/1973 | Brown | |
| 4,362,427 A | | 12/1982 | Mass et al. | |
| 4,522,413 A | | 6/1985 | Nicholas | |
| 4,708,517 A | | 11/1987 | Nicholas et al. | |
| 4,743,036 A | | 5/1988 | Nicholas | |
| 5,653,551 A | | 8/1997 | Seaux | |
| 5,900,203 A | | 5/1999 | Needham et al. | |
| 6,511,257 B1 | | 1/2003 | Seaux et al. | |
| 6,649,110 B1 | | 11/2003 | Seaux et al. | |
| 6,695,527 B2 | | 2/2004 | Seaux et al. | |
| 6,722,831 B2 | | 4/2004 | Rogers et al. | |
| 6,751,919 B2 | * | 6/2004 | Calixto | E04B 1/6816 |
| | | | | 404/49 |
| 7,303,800 B2 | * | 12/2007 | Rogers | B32B 3/02 |
| | | | | 404/34 |
| 7,413,374 B2 | | 8/2008 | Rogers et al. | |
| 8,925,264 B2 | * | 1/2015 | Thrush | E04F 15/02016 |
| | | | | 52/177 |
| 9,506,255 B1 | * | 11/2016 | Jones | E04F 15/02022 |
| 2008/0245014 A1 | | 10/2008 | Carter | |
| 2013/0264773 A1 | | 10/2013 | McDowell | |

FOREIGN PATENT DOCUMENTS

| | | |
|---|---|---|
| EP | 1762670 A1 | 12/2005 |
| GB | 1536684 | 12/1978 |
| WO | 2005/040523 A1 | 5/2005 |

\* cited by examiner

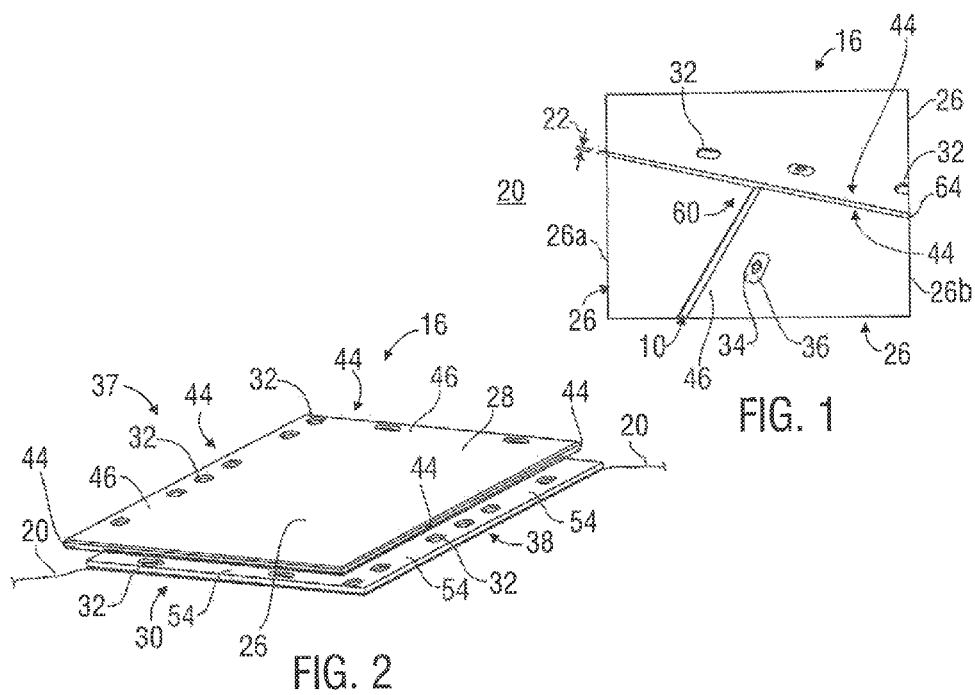
FIG. 1
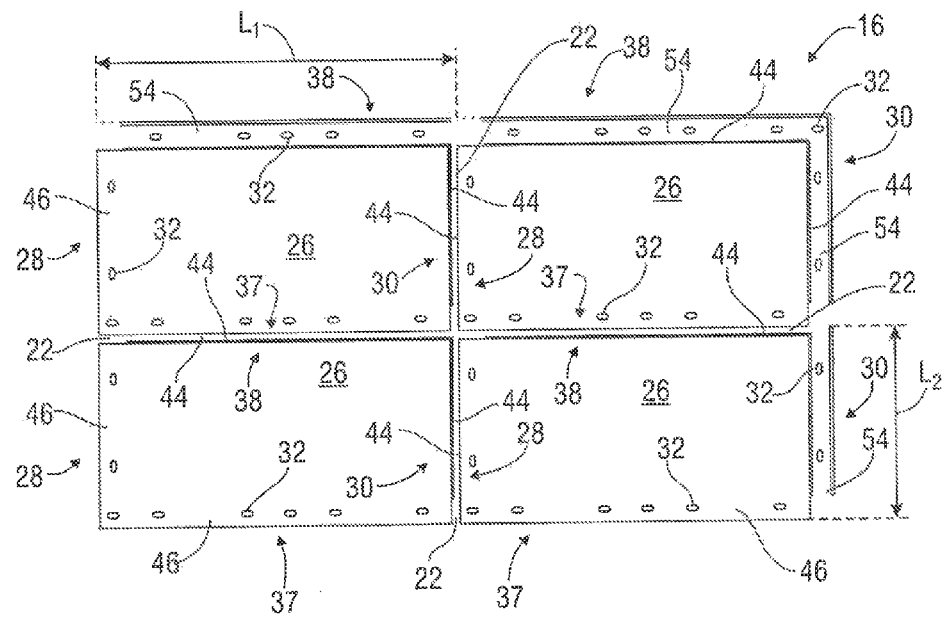
FIG. 2
FIG. 3

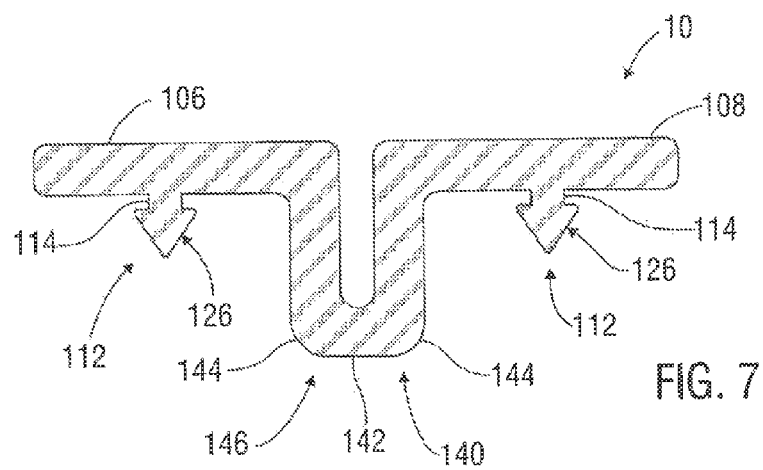
FIG. 7
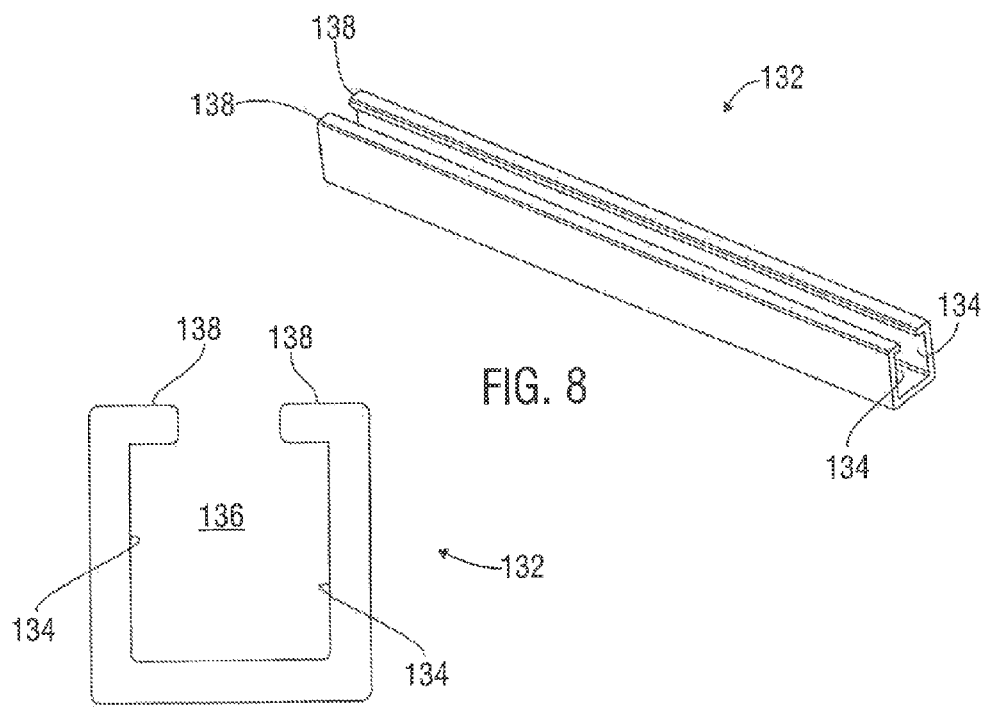
FIG. 8
FIG. 9

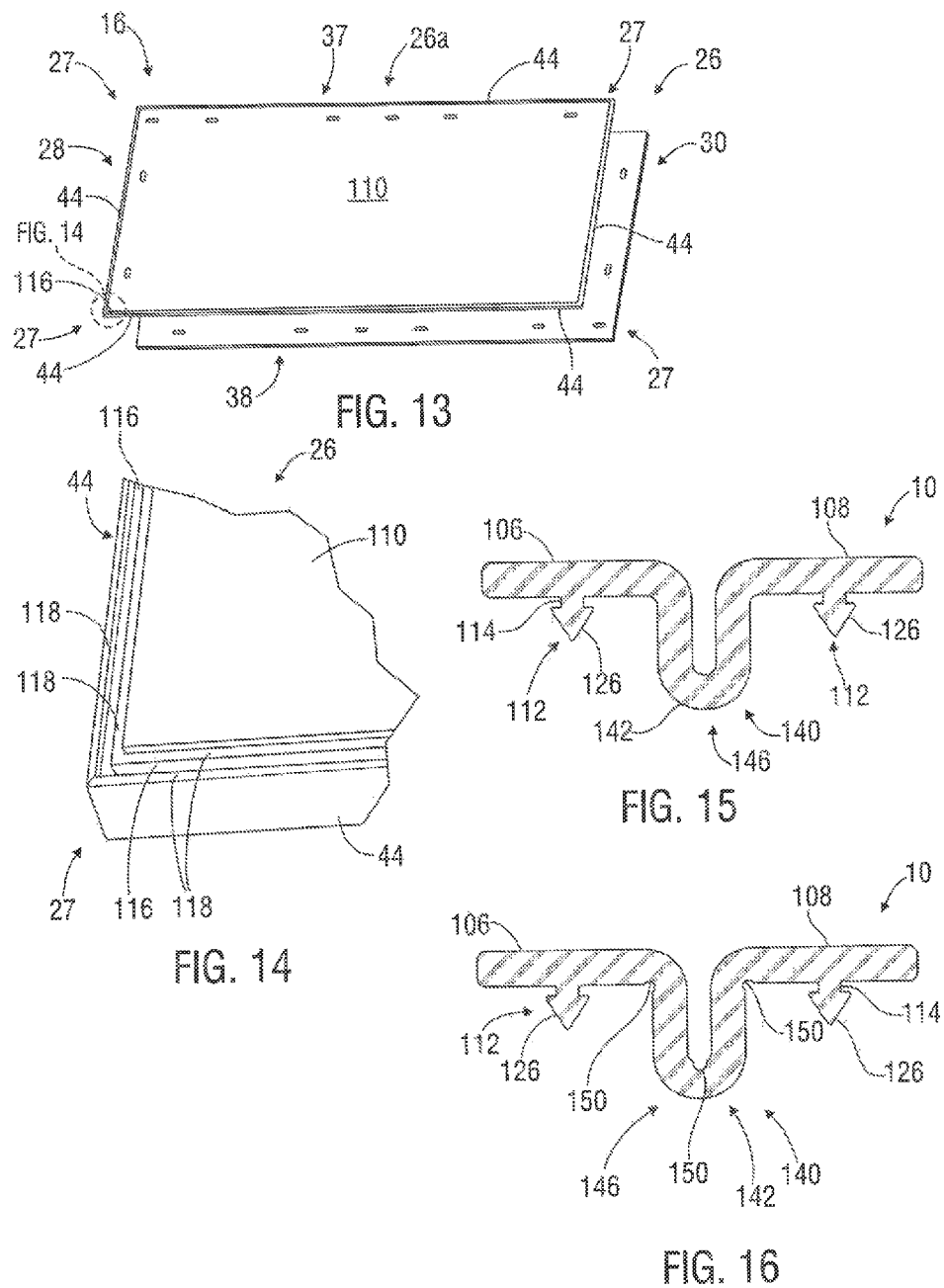

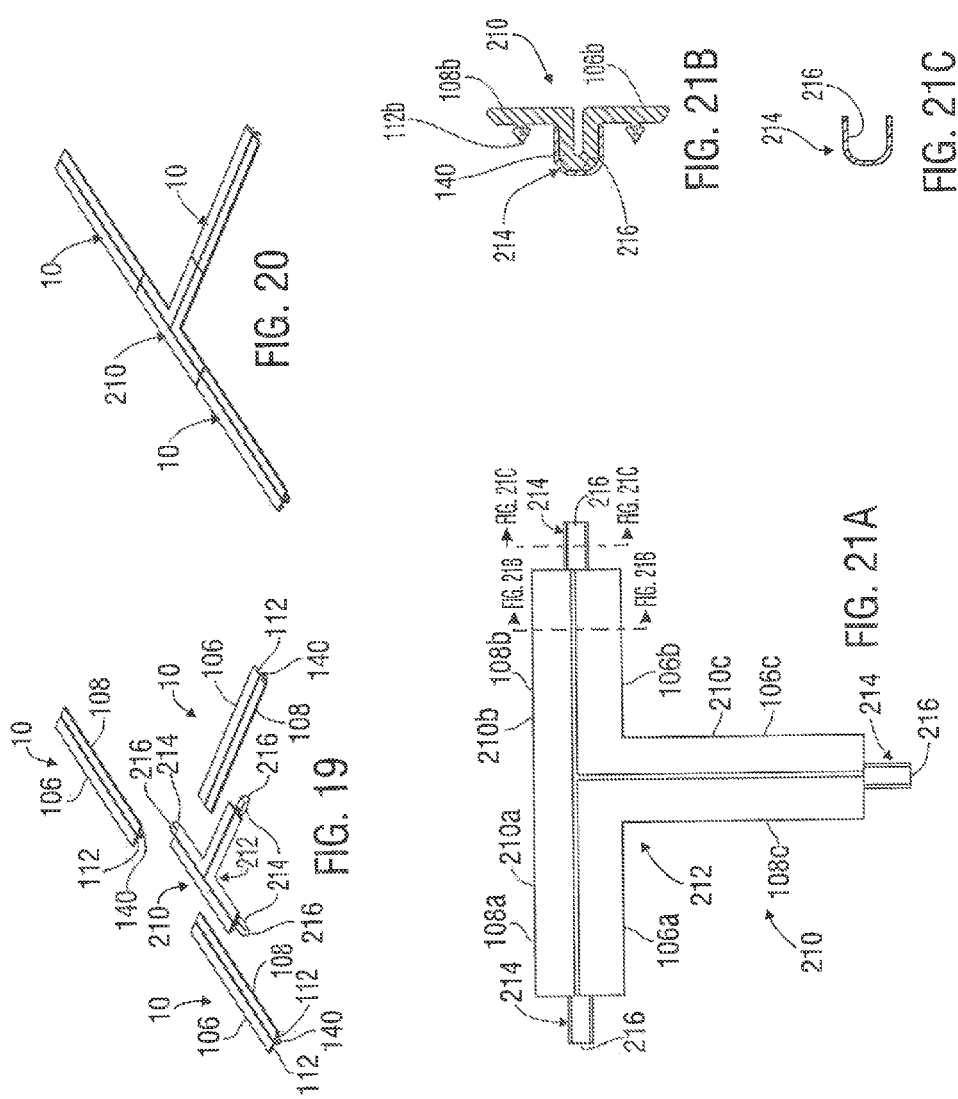

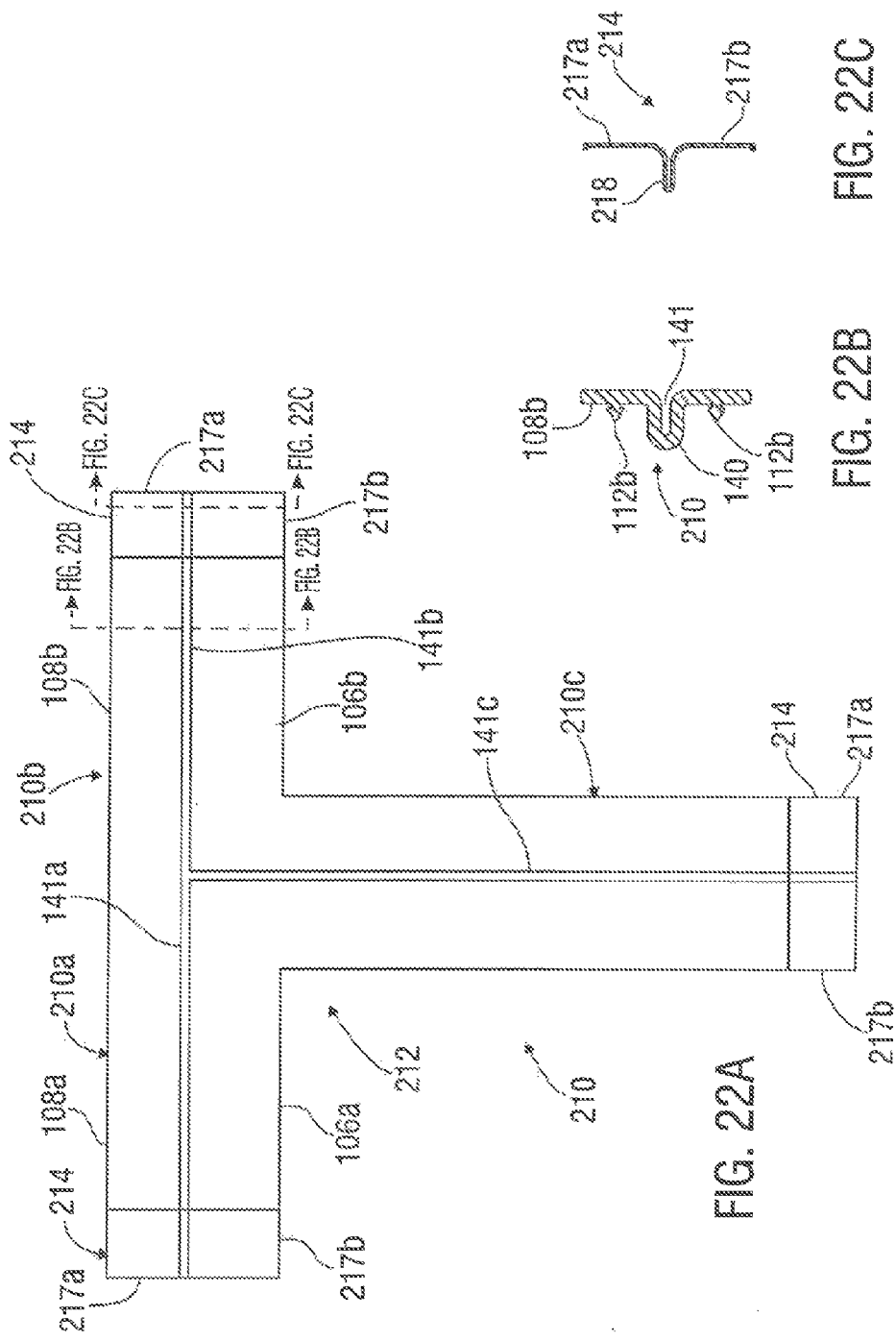

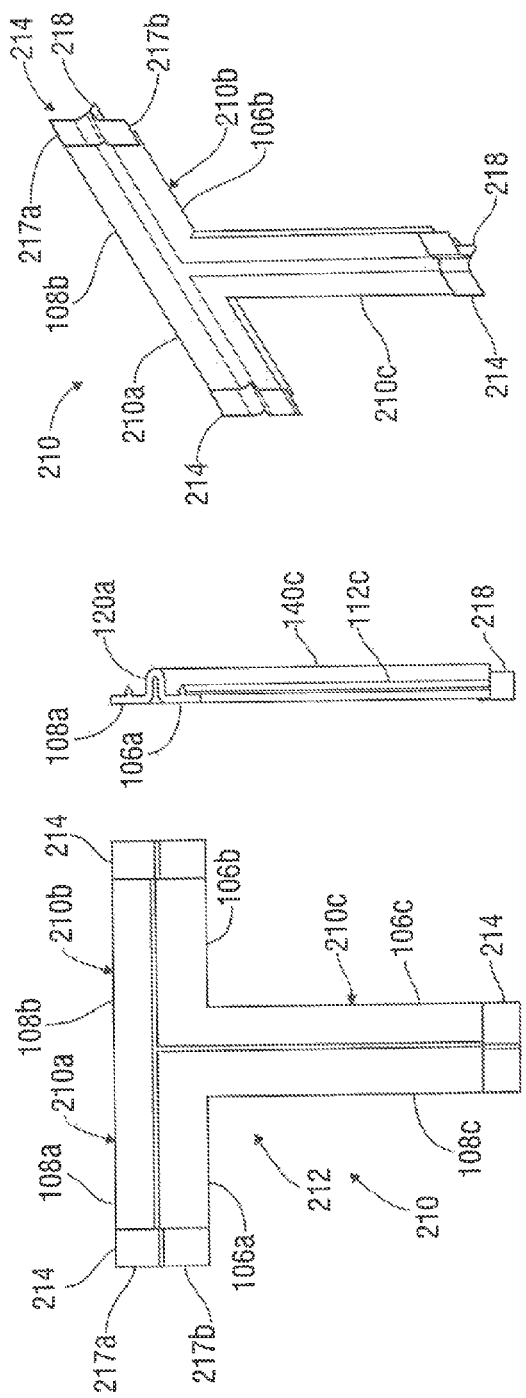

LOAD-SUPPORTING SURFACE WITH ACTIVELY CONNECTED GAP SEALS AND RELATED APPARATUS AND METHODS

CROSS REFERENCE TO RELATED APPLICATIONS

The present application claims priority to U.S. Provisional Patent Application Ser. No. 62/013,899, filed on Jun. 18, 2014 and entitled "Load-Supporting Surface with Interconnecting Components and Top Side Seal Assembly for Sealing Therebetween and Methods of Assembly and use Thereof", which is hereby incorporated herein in its entirety.

FIELD OF THE DISCLOSURE

The present disclosure relates generally to preventing the leakage of liquid from a load-supporting surface and, more particularly, to forming a seal between adjacent components of a load-supporting surface.

BACKGROUND

Temporary or semi-permanent support surfaces have been used for roadways, remote jobsites, industrial staging areas and the like in an ever-increasing myriad of industries, such as the construction, military, oilfield, transportation, disaster response, utilities and entertainment industries. These support surfaces are often made up of multiple components, such as heavy duty mats, which are reusable and interlock together to form the support surface.

In many instances, gaps are formed between the interconnected components of the support surface. Liquid that is spilled or otherwise introduced onto the support surface may seep through these gaps and into the earth or subgrade terrain. This presents various potential problems, including environmental and safety concerns and waste disposal challenges, and can lead to significant expense and effort for remediation, delay of operations, additional manpower and equipment for cleanup, etc.

For example, in many instances, plastic liners are placed below and around the support surface in an effort to capture liquids that are spilled or otherwise introduced onto the support surface before such liquids encounter the subgrade terrain. The use of liners with temporary or semi-permanent support surfaces may have one or more disadvantages. For example, discarding the liners can sometimes be problematic because landfill operators have expressed disinterest in accepting used liners on the basis that they are bulky and require excessive landfill space, or for other reasons. For another example, the plastic liners are sometimes ineffective at preventing liquid leakage from the support surface or allowing effective clean-up, which can cause other problems and require significant time and effort.

Thus, there is a need for improved apparatus, systems and methods for preventing liquids spilled or otherwise introduced onto a load-supporting surface from leaking through gaps formed between adjacent mats or other components.

It should be understood that the above-described features, capabilities and disadvantages are provided for illustrative purposes only and are not intended to limit the scope or subject matter of the appended claims or those of any related patent application or patent. Thus, none of the appended claims or claims of any related application or patent should be limited by the above discussion or construed to address, include or exclude each or any of the above-cited features, capabilities or disadvantages merely because of the mention thereof herein. For example, the above discussion involving the potentially disadvantageous use of "liners" should not be construed to mean that liners cannot be used with any one or more of the features or embodiments of the present disclosure discussed below or shown in the appended drawings (e.g. seal member 10), unless and only to the extent as may be explicitly provided in a particular claim and only with respect to such claim and any claims depending therefrom.

Accordingly, there exists a need for improved systems, articles and methods useful in connection with containing liquids introduced onto a load-supporting surface having one or more of the attributes or capabilities described or shown in, or as may be apparent from, the other portions of this patent.

BRIEF SUMMARY OF THE DISCLOSURE

In some embodiments, the present disclosure involves apparatus for forming a liquid-tight seal across gaps formed between adjacent components of a load-supporting surface useful at an outdoor worksite. The load-supporting surface is designed to support the weight of people, vehicles and equipment thereupon. The apparatus includes at least first and second mats arranged and adapted to be positioned adjacent to one another and releasably interconnected in the load-supporting surface. Each mat is configured to support the weight of people, vehicles and equipment thereupon and undergo movement relative to one or more other mats without disengaging from the load-supporting surface. Each mat has an upper surface, at least a first side and an outer edge extending along the first side. Each mat further includes an elongated channel formed in the upper surface thereof and disposed proximate to and extending at least partially along the outer edge thereof. When the first side of the first mat is positioned adjacent to the first side of the second mat in the load-supporting surface, a gap is formed between the adjacent outer edges of the respective first sides of the first and second mats.

In these embodiments, a liquid-impermeable, elongated seal member is arranged and adapted to form a seal between the first and second mats across the gap to prevent the entry of liquid into the gap from the upper surfaces of the first and second mats. The elongated seal member is configured to be coupled to the respective elongated channels of the first and second mats, sealingly engage each of the first and second mats at one or more locations on each the respective mat other than the outer edge thereof and extend across the gap. The seal member is configured to move within the gap in response to movement of at least one of the mats without the seal member losing its sealing engagement with the first and second mats or disengaging from the elongated channels thereof.

In many embodiments, the present disclosure involves apparatus for forming a liquid-tight seal across gaps formed between adjacent components of a load-supporting surface useful at an outdoor worksite. The load-supporting surface is designed to withstand outdoor environmental conditions at the worksite and support the weight of people, vehicles and equipment thereupon during normal operating conditions. The apparatus includes at least first and second thermoplastic mats arranged and adapted to be positioned adjacent to one another and interconnected in the load-supporting surface. Each mat is configured to withstand outdoor environmental conditions at the worksite, support the weight of people, vehicles and equipment thereupon and move relative to one or more other the mats in the load-supporting surface during normal operating conditions. Each mat has an upper surface, at least a first side and an outer edge extending along the first side. When the first side of the first mat is positioned adjacent to the first side of the second mat in the load-supporting surface, a gap is formed between the adjacent outer edges of the respective first sides of the first and second mats.

In these embodiments, a liquid-impermeable, elongated seal member constructed at least partially of rubber is arranged and adapted to form a seal between the first and second mats across the gap to prevent the entry of liquid into the gap from the upper surfaces of the first and second mats. The elongated seal member has an elongated central body and first and second elongated legs extending outwardly therefrom on opposite sides thereof. The first leg is configured to be sealingly coupled to the first mat at one or more locations on the mat other than the outer edge thereof and the second opposing leg is configured to be sealingly coupled to the second mat at one or more locations on the mat other than the outer edge thereof. The central body of the seal member is configured to extend across the gap and move relative to the gap in response to movement of at least one of the mats in the load-supporting surface without the seal member losing its sealing engagement with the first and second mats.

The present disclosure includes embodiments involving a method of assembling a load-supporting surface having a liquid-tight seal across gaps formed between adjacent thermoplastic mats of a load-supporting surface useful at an outdoor worksite and configured to support the weight of people, vehicles and equipment thereupon. Each mat is configured to support the weight of people, vehicles and equipment thereupon and undergo some movement relative to one or more other mats in the load-supporting surface without losing its interconnection with at least one other mat. The method includes forming an elongated channel in the upper surface of at least first and second thermoplastic mats proximate to an outer edge of at least a first side each respective mat. Each mat is positioned adjacent to at least one other mat. Adjacent mats are releasably interconnected to form the load-supporting surface. In particular, the first side of the first mat is positioned adjacent to the first side of the second mat and the first and second mats are releasably interconnected, forming a gap between the adjacent outer edges of the respective first sides of the first and second mats. A first elongated leg of a liquid-impermeable, elongated seal member is coupled to the elongated channel formed in the first mat and sealingly engages the first mat at one or more locations on the mat other than the outer edge thereof. A second elongated leg of the seal member is coupled to the elongated channel formed in the second mat and sealingly engages the second mat at one or more locations on the mat other than the outer edge thereof. A central body of the seal member disposed between the first and second legs extends across the gap and moves within the gap in response to movement of at least one of the first and second mats without the sealing member losing its sealing engagement with the first and second mats or disengaging from the elongated channels thereof.

In many embodiments, the present disclosure involves methods of manufacturing a plurality of mats useful in a load-supporting surface that includes a plurality of top side seal members. The mats are useful at an outdoor worksite and configured to support the weight of people, vehicles and equipment thereupon. Each top side seal member includes an elongated body and first and second legs extending from opposing sides thereof. Each leg includes at least one dart extending downwardly therefrom. Each top side seal member is engageable with at least two adjacent mats and configured to provide a liquid-tight seal across a gap formed between the adjacent mats. At least one milling machine, router or thermoplastic mold is used to form an elongated channel in the upper surface of at least first and second mats proximate to each outer edge of each among four sides of each mat. Each channel is formed to a desired depth in the respective mat. At least one milling machine, router or thermoplastic mold is used to form an elongated recess in the upper surface of each of the first and second mats around each of the respective channels formed therein to a depth that is shallower than the depth of the associated channel. Each recess extends from the corresponding outer edge of each mat to a location on the mat inwards of the corresponding channel and is configured to seat one of the legs of a first top side seal member, so that such leg sits at or below the upper surface of the mat. At least one elongated retainer is secured within each channel of each of the first and second mats. Each retainer includes first and second opposing elongated interior side walls surrounding a cavity disposed therebetween and at least one elongated lip extending into the cavity from one or both of the side walls thereof. At least one lip of each retainer is configured to grip at least one dart of the top side seal member leg seated in the associated recess of the corresponding mat and assist in retaining the leg in position relative to the associated mat. The first mat is configured to engage the first leg of the first top side seal member and the second mat is configured to engage the second leg of the first top side seal member.

In some embodiments, the present disclosure involves a corner seal member useful in a load-supporting surface having a plurality of releasably interconnectable, thermoplastic mats and a plurality of top sides seal members. The corner seal member is useful to provide a seal across gaps formed between adjacent mats at the intersection of first, second and third adjacent mats. The corner seal member includes first, second and third elongated arms joined together at a central junction. The first and second arms are linearly aligned with one another and the third arm perpendicularly intersects the first and second arms at the central junction.

Accordingly, the present disclosure includes features and advantages which are believed to enable it to advance load-support surface technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 1 is a top view of an exemplary load-supporting surface having seal members secured between adjacent interconnected mats in accordance with an embodiment of the present disclosure;

FIG. 2 is a perspective view of an exemplary mat used in the exemplary load-supporting surface of FIG. 1;

FIG. 3 is a top view of an exemplary load-supporting surface having four interconnected mats of the type shown in FIG. 2;

FIG. 7 is a cross-sectional view of the exemplary seal member shown in FIG. 6;

FIG. 8 is a perspective view of the exemplary retainer shown in FIG. 6;

FIG. 9 is an end view of the retainer shown in FIG. 8;

FIG. 13 is a perspective view of an exemplary mat useful as part of a top side seal assembly in accordance with the present disclosure;

FIG. 14 is an exploded view of the mat of FIG. 13 taken from inside the circle in FIG. 13 labeled "FIG. 14";

FIG. 15 is a cross-sectional view of another embodiment of a top side seal member in accordance with the present disclosure;

FIG. 16 is a cross-sectional view of another embodiment of a top side seal member in accordance with the present disclosure;

FIG. 19 is an exploded view of the exemplary corner seal member of FIG. 17 shown with three of the exemplary top side seal members of FIG. 7;

FIG. 20 is an assembled view of the corner seal member and top side seal members of FIG. 19;

FIG. 21A is a top view of the same exemplary corner seal member with extensions shown in FIG. 17;

FIG. 21B is a cross-sectional view of the corner seal member of FIG. 21A taken along lines FIG. 21B-FIG. 21B;

FIG. 21C is a cross-sectional view of the corner seal member of FIG. 21A taken along lines FIG. 21C-FIG. 21C;

FIG. 22A is a top view of the exemplary corner seal member of FIG. 17 shown having a different embodiment of extensions;

FIG. 22B is a cross-sectional view of the corner seal member of FIG. 22A taken along lines FIG. 22B-FIG. 22B;

FIG. 22C is a cross-sectional view of the corner seal member of FIG. 22A taken along lines FIG. 22C-FIG. 22C;

FIG. 25A is a top view of the exemplary corner seal member of FIG. 22A;

FIG. 25B is a side view of the exemplary corner seal member of FIG. 25A;

FIG. 25C is an end view of the exemplary corner seal member of FIG. 25A;

FIG. 25D is a perspective view of the exemplary corner seal member of FIG. 25A.

DETAILED DESCRIPTION OF PRESENTLY PREFERRED EMBODIMENTS

Figure 4:
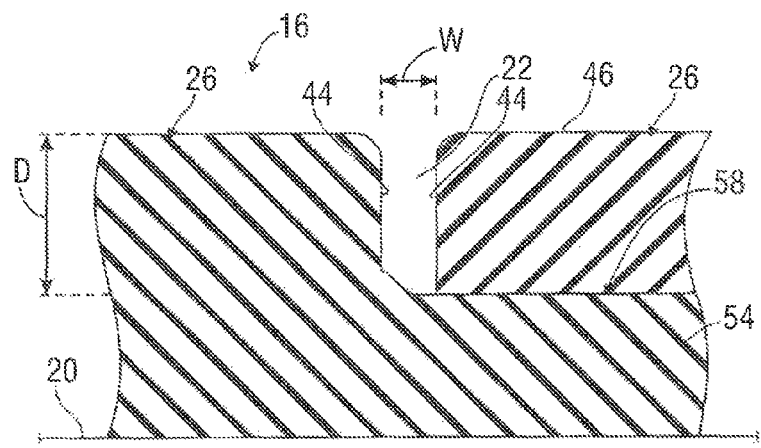
FIG. 4 is a cross-sectional view of two adjacent interconnected mats of an exemplary load-supporting surface.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent application or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring initially to FIG. 1, an exemplary elongated top side seal member 10 useful for preventing the leakage of liquid through a gap 22 formed between adjacent mats 26 in a load-supporting surface 16 onto the ground 20 or other surface or area below the load-supporting surface is shown. In this example, the load-supporting surface 16 is reusable and may be capable of supporting the weight of vehicles, equipment and/or other structures thereupon. The illustrated load-supporting surface 16 includes at least two interconnected adjacent mats 26.

Referring to FIG. 2, the mats 26 may have any suitable form, construction and configuration. Some examples of mats 26 which may be used in various embodiments of the present disclosure are shown and described in in U.S. Pat. No. 5,653,551 to Seaux, entitled "Mat System for Construction of Roadways and Support Surfaces" and issued on Aug. 5, 1997, and U.S. Pat. No. 6,511,257 to Seaux et al., entitled "Interlocking Mat System for Construction of Load Supporting Surfaces" and issued on Jan. 28, 2003, both of which have a common Assignee as the present patent application and the entire contents of which are hereby incorporated by reference herein in their entireties. For example, the mats 26 may be 14'×8' DURA-BASE® mats currently sold by the Assignee of this patent application. Each exemplary mat 26 may, in some instances, weight approximately 1,000 lbs., be heavy duty, durable, all-weather, reusable or designed to withstand 600 psi in pure crush pressure placed thereupon and capable of reducing point-to-point ground pressure on the ground 20 or other surface or area below the mat 26 caused by wheeled and/or tracked vehicles on the mat 26, or any combination thereof.

In the illustrated embodiment, each mat 26 is flat, or planar, and constructed of impermeable material, such as thermoplastic. The exemplary mat 26 has a rectangular shape with an opposing pair of short sides 28, 30, an opposing pair of long sides 37, 38, and an edge 44 extending along each side 28, 30, 37 and 38. In this particular example, the first short side 28 and first long side 37 each have an upper lip 46 extending horizontally outwardly therefrom, forming the edge 44 and which will be typically spaced above the ground 20 or other surface. The second short side 30 and second long side 38 each have a lower lip 54 extending horizontally outwardly therefrom below the edge 44 thereof and which will typically rest on the ground 20 or other surface. The upper and lower lips 46, 54 may have any suitable size, shape, configuration and length.

Still referring to FIG. 2, in this example, the respective upper and lower lips 46, 54 of different mats 16 are interconnectable with locking pins 34 (e.g. FIG. 1) releasably securable through corresponding locking pin holes 32 formed therein. The locking pin holes 32 and locking pins 34 may have any suitable form, construction and configuration. In this embodiment, the illustrated mats 26 include a plurality of locking pin holes 32, each configured to accept a releasable locking pin 34 (FIG. 1) therethrough. Each illustrated mat 26 may include, for example, a total of sixteen locking pin holes 32, eight holes 32 formed in each of the upper and lower lips 46, 54. In some embodiments, the locking pins 34 may form a liquid-tight seal around, or in, the locking pin holes 32 within which they are engaged. Some examples of locking pins 34 which may be used in various embodiments of the present disclosure are shown and described in U.S. Pat. No. 6,722,831 to Rogers et al, entitled "Fastening Device" and issued on Apr. 20, 2004, U.S. Provisional Patent Application Ser. No. 61/748,818, entitled "Apparatus and Methods for Connecting Mats" and filed on Jan. 14, 2013, and U.S. patent application Ser. No. 13/780,350, entitled "Apparatus and Methods for Connecting Mats" and filed on Feb. 28, 2013, all of which have a common Assignee as the present patent application and the entire contents of which are hereby incorporated by reference herein in their entireties.

In the illustrated example, the locking pin holes 32 of the mats 26 have an oval-shape to accept an oval-shaped enlarged head 36 (e.g. FIG. 1) of the illustrated locking pins 34. It should be noted, however, that the top side seal member 10 of the present disclosure is not limited to use with the above-described or referenced types and configurations of load-supporting surfaces 16, mats 26, locking pins 34 and locking pin holes 32, or to the disclosures of the above-referenced patents and patent applications. Any suitable load-supporting surfaces 16, mats 26, locking pins 34 and locking pin holes 32 may be used. For example, some embodiments of the seal member 10 may be used with mats 26 not having upper and/or lower lips 46, 54. Moreover, the seal member 10 may be used with load-supporting surfaces not having mats, locking pins or locking pin holes. Thus, the seal member 10 of the present disclosure may be used with any type of load-supporting surface having any desired components and is not limited thereby, unless and only to the extent as may be explicitly required in a particular claim hereof and only for such claim and any claims depending therefrom.

Referring to FIGS. 3 and 4, in the illustrated exemplary load-supporting surface 16, the gaps 22 are formed between adjacent edges 44 of adjacent respective sides of each pair of interconnected mats 26. Each illustrated gap 22 has a width W, depth D and length $L_1$ or $L_2$ and is in fluid communication with a horizontally-extending interface 58 formed between the adjacent upper and lower lips 46, 54 of the adjacent mats 26. The illustrated interface 58 is in fluid communication with the ground 20 or other surface or area beneath the load-supporting surface 16. Thus, in this example, liquid that enters the gap 22 may seep or flow into the interface 58 between the mats 26 and then onto the ground 20 (or other surface or area) below the load-supporting surface 16.

Figure 5:
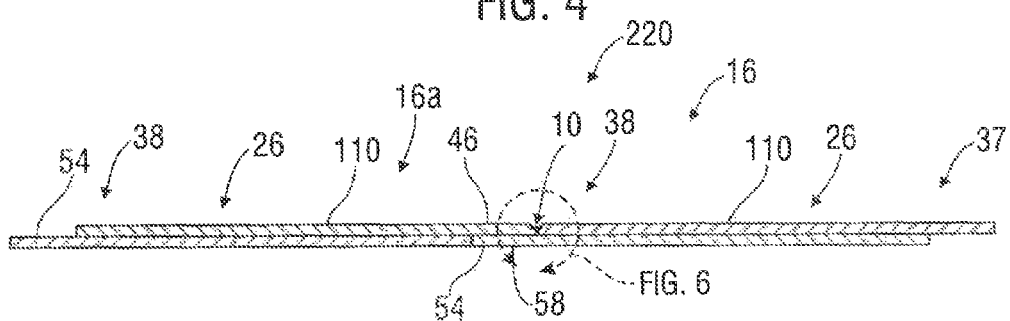
FIG. 5 is a cross-sectional view of two exemplary interconnected mats having a top side seal member engaged therewith in accordance with an embodiment of the present disclosure.
Figure 6:
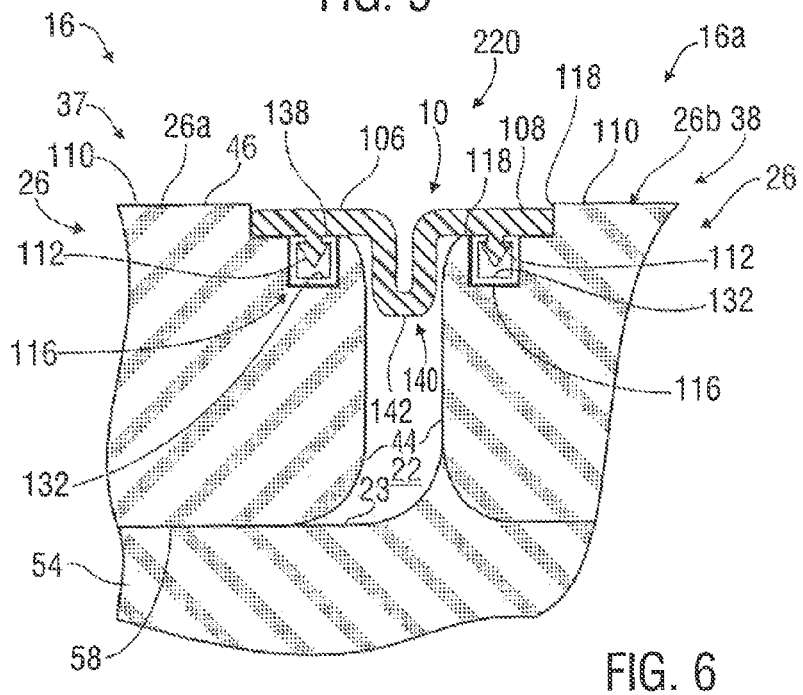
FIG. 6 is a an exploded view of the exemplary mats and seal member of FIG. 5 taken from inside the circle in FIG. 5 labeled "FIG. 6"

Referring now to FIGS. 5 and 6, the exemplary top side seal member 10 is configured to provide a liquid-tight seal over, or across, the gap 22 between adjacent mats 26 to prevent liquid introduced onto the load-supporting surface 16 from entering the gap 22 and/or from flowing from the gap 22 into the interface 58. The top side seal member 10 may have any suitable form, configuration and operation. In this embodiment, the top side seal member 10 forms a seal across the gap 22 between the respective upper surfaces 110 of adjacent mats 26. A first elongated leg 106 of the illustrated seal member 10 engages the first mat 26a, a second elongated leg 108 of the seal member 10 engages the adjacent second mat 26b and the seal member 10 extends therebetween across the gap 22. In this example, liquid-tight sealing engagement occurs at one or more interfaces between each leg 106, 108 and the corresponding adjacent mat 26. The exemplary seal member 10 is thus actively connected or tied to the mats 26 and effectively serves as an intermediate upper surface over or across the gap 22 between adjacent mats 26 to retain liquid on the top side of the load-supporting surface 16. It should be noted, however, that, in some embodiments, the seal member 10 does not align entirely with the upper surfaces 110 of the adjacent mats 26. For example, as will be described further below, the illustrated seal member 10 dips, or folds, into the gap 22. Accordingly, reference herein to the seal member 10 or a component thereof extending, or sealing, "across" or "over" the gap 22 means over or above the lower surface 23 of the gap 22.

The exemplary top side seal member 10 may engage the adjacent mats 26 on opposing sides of the gap 22 in any suitable manner and with any suitable mechanism. For example, the seal member 10 may be sealingly bonded or adhered to the upper surface 110 of each respective adjacent mats 26a, 26b, such as with the use of one or more sealing or bonding agent. For another example, the seal member 10 may be bolted, clipped or otherwise mechanically fastened to the adjacent mats 26. In such instances, if desired, sealant may be provided at or over the fastening points (not shown) between the seal member 10 and mats 26 to ensure a liquid-tight seal.

In yet another example, referring specifically to FIG. 6, the seal member 10 may be engageable with one or more elongated channels 116 formed in the respective side (e.g. sides 37, 38) of each adjacent mat 26 proximate to, and extending along, at least a portion of the edge 44 thereof. As used herein, the term "elongated" means a component having a length that is greater than its other dimensions. In some instances, components described herein as "elongated" may have a length that is similar to the length of a side 28, 30, 37 or 38 (e.g. FIG. 2) of a mat 26. In the present embodiment, as shown in FIGS. 13 & 14, channels 116 may be machined or integrally formed into each mat 26 along, and in spaced relationship with, the edge 44 of each side 28, 30, 37, 38 of the mat 26 and intersect at the mat's corners 27. For example, one or more router or milling machine may be used to form the channels 116 into the mats 26. If desired, the router(s) and/or milling machine(s) may be robotic. For another example, the channels 116 may be integrally formed into the mats 26 during molding of the mats, such as with the use of pre-formed molds used in any desired mat molding process (e.g. thermoplastic compression, rotational or injection molding).

The seal member 10 may engage one or more channel 116 in any suitable manner. Referring again to FIG. 6, in the illustrated embodiment, each leg 106, 108 includes an elongated, downwardly extending dart 112 (e.g. FIG. 7) that engages at least one respective channel 116 formed in one of the mats 26a, 26b to retain the seal member 10 in engagement therewith. The exemplary dart 112 may engage one or more channel 116 in any suitable manner. For example, the dart 112 may have a width, or diameter, that is larger than the width, or diameter, of the channel 116 so that it can be friction fit therein. For another example, the dart 112 and channel 116 may include respective interconnectable mating portions (not shown) to provide secure engagement therebetween.

For still a further example, the dart 112 may snap, or clip, into engagement with the channel 116 or a component therein. In the embodiment of FIG. 6, each dart 112 engages at least one elongated retainer 132 secured within one or more of the channels 116. The retainer 132 may have any suitable form, configuration and operation. Referring to FIGS. 8 and 9, the exemplary retainer 132 is constructed of resilient material, such as polyvinyl chloride (PVC) or other suitable plastic. The illustrated retainer 132 includes first and second opposing elongated interior side walls 134 surrounding a cavity 136 formed therebetween. At least one elongated lip 138 extends into the illustrated cavity 136 from one or both of the illustrated side walls 134. Each exemplary lip 138 engages at least one dart 112 of one of the legs 106, 108.

When included, the retainer 132 may be secured in the channel 116 in any suitable manner. In the illustrated embodiment, the retainer 132 (FIG. 10) has a width W1 that is larger than the width W2 of the associated channel 116 so that it can be friction fit therein to secure the retainer 132 to the mat 26. Likewise, the dart 112 may engage the retainer 132 in any suitable manner. In the exemplary embodiment, as shown in FIG. 7, the dart 112 includes an elongated, downwardly extending neck 114 having at least one elongated protrusion 126 extending outwardly therefrom. Each illustrated protrusion 126 is spaced downwardly from its associated leg 106, 108 on the neck 114 and configured to engage one or more lips 138 (FIG. 9) of the retainer 132.

Figure 11:
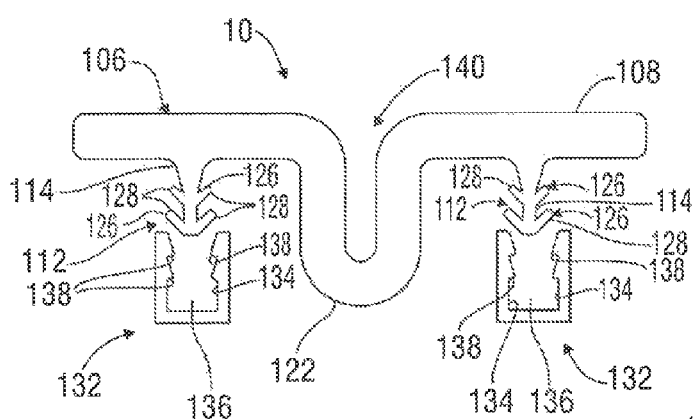
FIG. 11 is an assembly drawing of an embodiment of a top side seal member and an exemplary retainer in accordance with the present disclosure.
Figure 12:
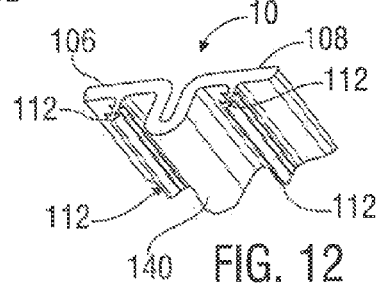
FIG. 12 is a perspective view of the exemplary top side seal member shown in FIG. 11.

The protrusion(s) 126 and lip(s) 138 may have any suitable form, configuration and operation. In the embodiment of FIG. 7, each protrusion 126 is arrow-shaped, and each wall 134 (FIG. 9) of the retainer 132 includes a 90 degree angled lip 138. For another example, in FIGS. 11 & 12, multiple protrusions 126 in the form of first and second spaced elongated fingers 128 on opposing sides of the neck 114 engage one among first and second angled lips 138 extending into the cavity 136 from each interior side wall 134 of the retainer 132. This embodiment may, for example, provide redundancy in gripping between the dart 112 and retainer 132 to enhance engagement therebetween. However, any other suitable arrangement may be used.

Referring back to the embodiment of FIG. 10, one or more elongated recess 118 may be formed in each mat 26 around the channel(s) 116, such as to receive or seat a corresponding leg 106, 108 of the seal member 10 so that the seal member 10 sits flush with, or below, the height of the upper surface 110 of the mat 26. In at least some applications, this could be beneficial to prevent the seal member 10 from becoming damaged, crushed or displaced due to movement or placement of vehicles, equipment, personnel or other items on the load-supporting surface 16. The recess 118 may have any suitable form, configuration and operation. In the illustrated example, the recess 118 extends from the edge 44 of the respective side (e.g. sides 37, 38) of the mat 26 to a location on the mat 26 inwards of the corresponding channel 116 to accommodate and seat the full length of the leg 106 or 108 (e.g. FIG. 6). As shown in FIG. 6, the exemplary recesses 118 each have a depth configured so that the seal member 10 positioned therein will sit just below the height of the upper surface 110 of the mats 26. In this embodiment, as shown in FIGS. 13 &14, the recesses 118 are formed along each side 28, 30, 36, 37 of the mat 26 and intersect one another at the mat's corners 27. In the present embodiment, the recesses 118 may be machined or integrally formed into each mat 26. For example, one or more router or milling machine may be used to form the recesses 118 into the mats 26. If desired, the router(s) and/or milling machine(s) may be robotic. For another example, the recesses 118 may be integrally formed into the mats 26 during molding of the mats, such as with the use of pre-formed molds used in any desired mat molding process (e.g. thermoplastic compression, rotational or injection molding).

Referring back to FIG. 6, in some embodiments, the top side seal member 10 may be designed to respond to movement of one or both adjacent mats 26 or the load-supporting surface 16 without losing its sealing engagement therewith. For example, the seal member 10 may flex, bend, deform or move between the adjacent mats 26 and/or in the gap 22 to accommodate geometric changes, expansion, compression, movement or displacement of one or both mats 26a, 26b or the load-supporting surface 16. This may be accomplished in any suitable manner. For example, the seal member 10 may be formed with slack between the legs 106, 108 to allow it to flex, bend, deform or move without losing sealing engagement of the legs 106, 108 and adjacent mats 26a, 26b. As the geometry of the gap 22 changes, the seal member 10 responds.

Still referring to FIG. 6, in some embodiments, the seal member 10 includes an elongated central body 140 located between the legs 106, 108 and configured to flex, bend, deform or move between the adjacent mats 26a, 26b. In the illustrated embodiment, the central body 140 is positionable in the gap 22, but does not fill the gap 22 or sealingly engage the edges 44 of the adjacent mats 26 forming the gap 22. When included, the central body 140 may flex, bend or move in any suitable manner. For example, the seal member 10 or its central body 140 may be constructed of one or more flexible, pliable or bendable materials so that the central body 140 can flex, bend or move upon movement of one or both adjacent mats 26a, 26b or the load-supporting surface 16. Any suitable material may be used. For example, in some applications, the seal member 10 may be constructed of neoprene.

Still referring to the embodiment of FIG. 6, if desired, the central body 140 may have with one or more folds, or pleats, 142 that allows the central body 140 to expand and contract, or move, without disengaging the legs 106, 108 from the mats 26. In some embodiments, the central body 140 may move in an accordion-like manner relative to the legs 106, 108. In the illustrated example, as shown in FIG. 7, the central body 140 has a single fold 142 and is formed having a U-shaped cross-sectional shape with squared corners 144 at its base 146. In the example of FIG. 15, the central body 140 has a generally U-shaped cross-sectional shape without corners at its base 146, which may, in some applications, allow greater flexibility or ease of movement of the central body 140 as compared to the embodiment of FIG. 7. For another example, in FIG. 16, one or more cut-outs 150 are provided at desired locations in or adjacent to the central body 140, such as to allow even greater flexibility, bending or ease of movement of the central body 140. It should be noted, however, that the present disclosure is not limited to these example configurations of the central body 140 and any other suitable configurations that allow the central body 140 to expand and contract, or move, as desired without disengaging the legs 106, 108 from the mats 26 may be used.

Still referring to the embodiment of FIG. 6, the top side seal member 10 may be constructed of any suitable material that is impermeable to liquid flow and can provide a liquid-tight seal between adjacent mats 26 by preventing liquid introduced onto the load-supporting surface 16 from permeating through or around the seal member 10 into the gap 22 or interface 58. If desired, the seal member 10 may be constructed of material known or believe to maintain its beneficial qualities (e.g. strength, robustness, durability, impermeability) during expected or potentially harsh environmental and weather conditions (e.g. heat, cold, temperature changes, rain, snow, etc.). In some embodiments, the top side seal member 10 is constructed of rubber, such as neoprene, and formed in an extrusion process with the use of one or more extruders. For another example, the top side seal member 10 may be formed by casting with the use of one or more molds.

If desired, one or more sealant or other material may be included to assist in providing a liquid-tight seal between each seal member 10 and associated mats 26. In the embodiment of FIG. 6, for example, commercially available sealant may be placed between each leg 106, 108 of each seal 26 and the corresponding mat 26 or recess 118 formed therein; over and/or around each leg 106, 108 and adjacent mat 26; between each dart 112 and corresponding channel 116 or retainer 132 provided therein; within each channel 116 and/or retainer 132; or otherwise as desired. Any suitable sealant, such as silicone glue, may be used. For another example, fibrous absorbent may also or instead be used. Suitable fibrous absorbents may include any combination of "renewable" fibrous natural material, such as one or more among cotton, sisal, kapok, agave/henequen, abaca/manila hemp, palmetto, flax/linen, hemp/burlap, jute, ramie, kenaf, coir, wool, cellulose fibers or the like, as well as synthetic, man-made or non-fibrous materials. In some embodiments, kenaf may be a preferred fibrous absorbent.

Figure 17:
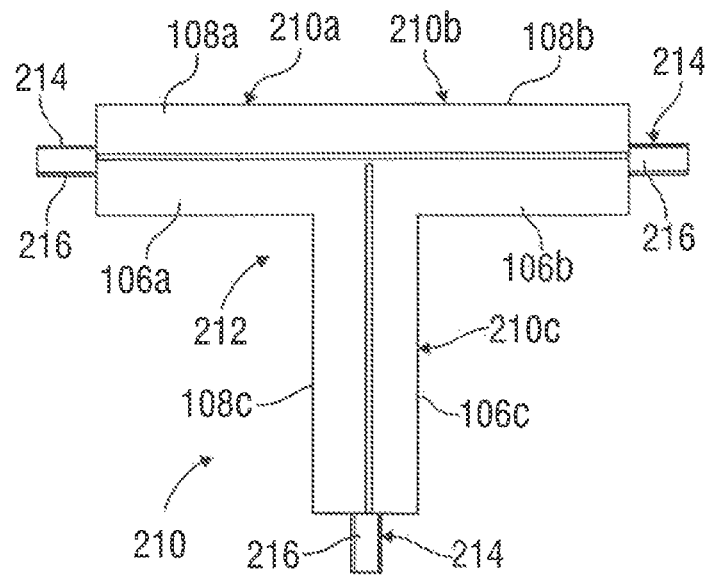
FIG. 17 is a top view of an exemplary corner seal member and associated extensions in accordance with an embodiment of the present disclosure.
Figure 18:
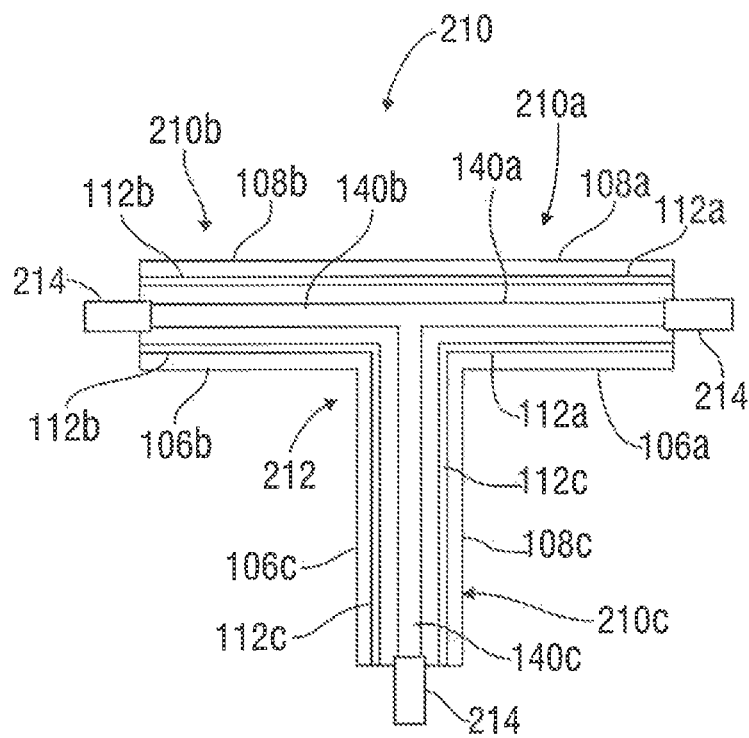
FIG. 18 is a bottom view of the corner seal member shown in FIG. 17.

Now referring to the embodiment of FIGS. 17 & 18, a corner seal member 210 may be provided for sealing across the gaps 44 formed at an intersection, or corner, 60 of three mats 26 (e.g. FIG. 1). In this example, the corner seal member 210 includes three arms 210a-c that intersect one another at a central junction 212. The exemplary first and second arms 210a, 210b are linearly aligned with one another, while the third arm 210c perpendicularly intersects them at the junction 212. Each arm 210a-c otherwise has the same form, configuration and operation as the exemplary top side seal members 10 described and shown herein.

In this embodiment, the corresponding legs 106, 108, darts 112 and central bodies 140 of the adjacent arms 210a-c on the seal member 210 intersect or join one another. For example, the first leg 106a of the first arm 210a intersects the second leg 108c of the third arm 210c; the first leg 106c of the third arm 210c intersects the first leg 106b of the second arm 210b; and the respective second legs 108a, 108b of the first and second arm 210a, 210b intersect one another. For another example, the dart 112a of the first leg 106a of the first arm 210a intersects or joins the dart 112c of the second leg 106c of the third arm 210c.

If desired, the corner seal member 210 may be configured to sealingly engage the three corresponding adjacent seal members 10. For example, in the embodiment of FIGS. 19-20, the seal member 210 may include an extension 214 protruding laterally therefrom at each end and sealingly engageable with the end of the adjacent seal member 10. The extension 214 may have any suitable form, configuration, construction and operation. The illustrated extension 214 sits below the seal member 210 and includes a recess 216 formed and configured to accept and sealingly engage a section of the central body 140 of the aligned seal member 10. Thus, when seal members 10, 210 are engaged with the corresponding mats 26, a portion of the central body 140 of the exemplary seal member 10 will tightly mate with, or sit within, the recess 216.

In this embodiment, each extension 214 is molded to a corresponding arm 210a-c of the corner seal member 210. For example, FIGS. 21A-C show in detail the extension 214 molded to a section of the central body 140 of the second arm 210b of the corner seal member 210 and extending laterally outwardly therefrom. In other embodiments, the extension 214 may be integrally formed as part of the seal member 210 or connected with adhesive, mechanical connectors and/or any other suitable mechanism(s).

Figure 24:
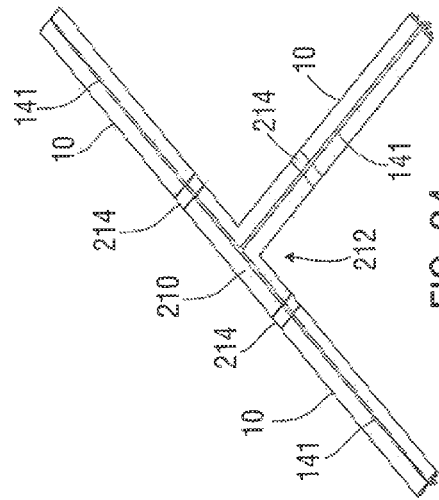
FIG. 24 is an assembled view of the corner seal member and top side seal members of FIG. 23.
Figure 23:
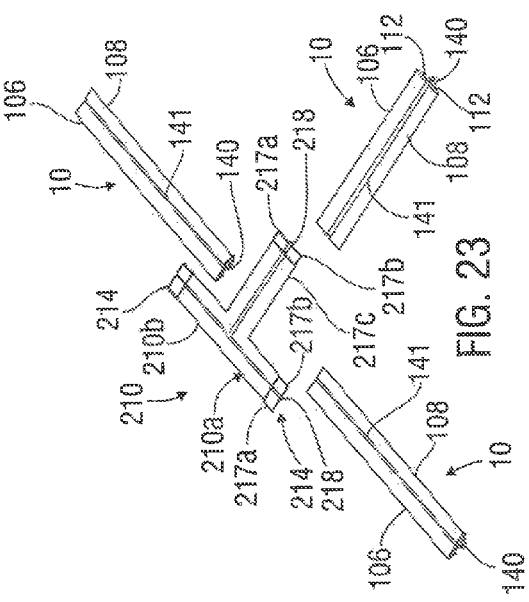
FIG. 23 is an exploded view of the corner seal member of FIG. 22A shown with three of the exemplary top side seal members of FIG. 7.

In the embodiment of FIGS. 22A-C, the extension 214 sits above the seal member 210 and is formed and configured to extend over and sealingly engage a section of the aligned adjacent seal members 10 (FIGS. 23 & 24). For example, the illustrated extension 214 includes left and right fingers 217a, 217b that will extend over a portion of the first and second legs 108, 106, respectively of the corresponding adjacent seal members 10. The exemplary extension 214 also includes a protruding section 218 that will nest in, or mate with, the orifice 141 (FIGS. 23 & 24) of the central body 140 of the corresponding seal member 10. Thus, when seal members 10, 210 are engaged with the corresponding mats 26, the extension 214 will overlap and sealingly engage the exemplary adjacent seal members 10.

In this embodiment, each extension 214 (e.g. FIGS. 22A-C) is also molded to a corresponding arm 210a-c of the corner seal member 210. For example, the extension 214 may be molded over a section of the central body 140 and legs 106*b*, 108*b* of the second arm 210*b* of the corner seal member 210 and extend laterally outwardly therefrom. (See also FIGS. 25A-D).

Figure 10:
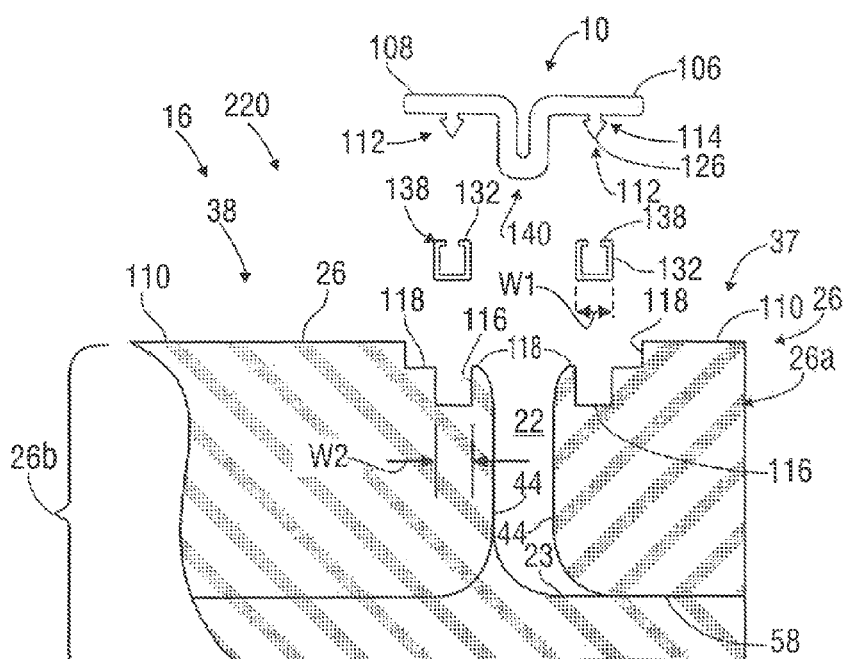
FIG. 10 is a partial-cross sectional assembly drawing of an embodiment of a top side seal system in accordance with the present disclosure.

Referring back to the embodiment of FIG. 10, the top side seal member 10 may be part of a top side seal assembly 220 including least two mats 26, each having at least one channel 116 extending along each side thereof 28, 30, 37, 38 (e.g. FIGS. 13 & 14), such as described above. If desired, one or more corner seal members 210 (e.g. FIGS. 17-25D) may be included.

Referring again to FIG. 6, in an exemplary method of use of the seal members 10 and assembly 220, the channels 116 are formed into the mats 26. If recesses 118 are also provided in the mats 26, they are formed around each channel 116. If retainers 132 are to be included, they are secured in the channels 116 of the mats 26, and the mats 26 are connected together as part of a load-supporting surface 16. If any corner seal members 210 are used with extensions 214 that extend below the seal members 10 (e.g. FIGS. 17-21C) at the corner, or intersection, 60 (e.g. FIG. 1) of three adjacent mats 26, the corner seal members 210 are engaged with the three adjacent mats 26 across the gaps 44 formed therebetween at each such corner 60. Thereafter, at least one elongated seal member 10 is engaged with each pair of adjacent mats 26 across the gap 44 formed therebetween and over the extensions 214 of the corner seal members 210. For example, if multiple mats 26 are connected around the periphery of the first mat 26*a* (FIG. 13), a seal member 10 may be engaged along each side 28, 30, 37, 38 of the mat 26*a* between it and the respective adjacent connected mat 26 (not shown). However, if any corner seal members 210 are used with extensions 214 that extend above the seal members 10 (e.g. FIGS. 22A-25D) at the intersection 60 (e.g. FIG. 1) of three adjacent mats 26, the corner seal members 210 are engaged after the seal members 10 are emplaced so the extensions 214 engage over the ends of the seal members 10.

Still referring to the embodiment of FIG. 6, the seal members 10 are engaged with the adjacent mats 26 in any suitable manner. If each seal member 10 includes at least one dart 112 extending from first and second legs 106, 108 thereof, the seal member 10 is engaged with adjacent mats 26 by securing, such as snapping, its darts 112 into the retainers 132 in the corresponding adjacent mats 26. When the mats 26 include recesses 118, the legs 106, 108 are positioned in the respective recess 118. In some applications, sealant may be placed at desired locations between the seal members 10 and the respective mats 26 (e.g. between the darts 112 and the retainers 132, between the legs 106, 108 and the recesses 118, etc.), over at least part of each seal member 10 and adjacent mat 26 or otherwise as desired. Thereafter, the exemplary seal members 10 stay connected to the respective mats 26, flexing or moving as necessary while providing a liquid-tight seal across the gaps 22 in the load-supporting surface 16 during normal operating conditions. If one or more corner seal members 210 (e.g. FIG. 22A) are used, the same procedure of engaging the seal member 210 with its adjacent mats 26 as described above with respect to the seal member 10 would apply.

While the top side seal member 10 is described herein as being used over or across gaps 22 formed between adjacent mats 26, it may be used similarly as described above between mats 26 and other components associated with a load-supporting surface 16, or between the other components themselves. Some potential additional components that may be useful in connection with load-supporting surfaces 16, such as berm members, spacers, drive-over barriers, liquid drain assemblies, electrically conductive covers, sealing systems, etc., are shown and disclosed in U.S. Pat. No. 9,039,325 B2 to McDowell, entitled "Liquid Containment System for Use With Load-Supporting Surfaces" and issued on May 26, 2015, U.S. patent application Ser. No. 14/720,799, entitled "Liquid Containment System" and filed on May 24, 2015, U.S. patent application Ser. No. 14/496,105 entitled "Apparatus & Methods for Electrically Grounding a Load-Supporting Surfaces" and filed on Sep. 25, 2014, all of which have a common Assignee as the present patent application and the entire contents of which are hereby incorporated by reference herein in its entirety.

Figure 26:
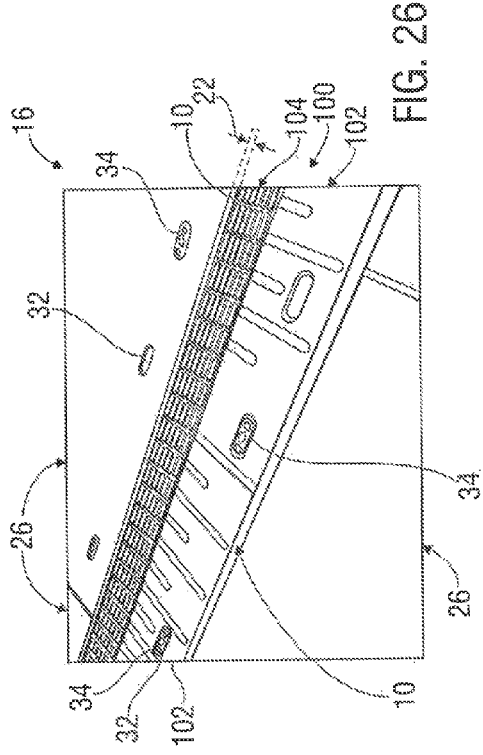
FIG. 26 is a top view of an exemplary load-supporting surface having an exemplary top side seal member secured between a liquid drain assembly and adjacent mats in accordance with an embodiment of the present disclosure.

For example, in the embodiment of FIG. 26, seal members 10 are shown engaged in gaps 22 formed between a liquid drain assembly 100 and mats 26 of the illustrated load-supporting surface 16. The illustrated liquid drain assembly 100 includes a pair of elongated, axially-aligned drain channels 102 such as described in U.S. Pat. No. 9,039,325 B2 and U.S. patent application Ser. No. 14/720,799. Each exemplary drain channel 102 includes at least one elongated liquid flow passageway (not shown) that allows controlled drainage of liquid off of the load-supporting surface 16. In this example, the passageways are covered with a load bearing cover 104 useful to allow people, vehicles (not shown) or other equipment or structures to move across the load-supporting surface 16 or be placed atop the drain channel 102, such as described in U.S. Pat. No. 9,039,325 B2 and U.S. patent application Ser. No. 14/720,799. The illustrated drain channels 102 also include locking pin holes 32 through which locking pins 34 are engageable for connection with adjacent mats 26.

Accordingly, in many embodiments, the seal members 10 may be used in a load-supporting surface 16 to create a positive liquid impermeable seal across the gaps 22 between mats 26 and/or other components. This may be useful in certain applications to prevent liquid from entering one or more gaps 22 and flowing off the sides of the load-supporting surface 16, and/or prevent the leakage of liquid from atop or between adjacent mats 26 and/or other components onto the ground 20 or other underlying surface or area, all without the need for liners (not shown) underneath the load-supporting surface 16. As discussed above, the load-supporting surface 16 may be designed to be functional in varied operating conditions, including bearing the weight of vehicles, equipment and personnel thereupon and moving thereacross and environmental factors such as heat, cold, temperature changes, rain, snow, etc. The conditions that are expected in a particular use scenario and within which the load-supporting surface 16 is expected to function are referred to herein as "normal operating conditions" or variations thereof.

If desired, the seal members 10 may be part of a spill management system to prevent liquid leakage from one or more permanent, semi-permanent or temporary load-supporting surface 16 and facilitate clean-up or disposal of such liquid. For example, the seal members 10 may be used in conjunction with technology shown and disclosed in any combination of U.S. patent application Ser. No. 14/497,429, filed on Sep. 26, 2014 and entitled "Apparatus & Methods for Sealing Around the Opening to an Underground Borehole", U.S. patent application Ser. No. 14/666,584, filed on Mar. 24, 2015 and entitled "Apparatus & Methods for Mechanically Coupling a Sealing System Around the Opening to an Underground Borehole", U.S. patent application Ser. No. 13/803,580, filed on Mar. 14, 2013 and entitled "Apparatus and Methods for Sealing Between Adjacent Components of a Load-Supporting Surface", U.S. Provisional Patent Application Ser. No. 62/011,805, filed on Jun. 13, 2014 and entitled "Load-Supporting Surface with Interconnecting Components and Frame-Style Seal Assembly for Sealing Therebetween and Methods of Assembly and Use Thereof", and U.S. Provisional Patent Application Ser. No. 62/116,989, filed on Feb. 17, 2015 and entitled "Load-Supporting Surface with Interconnecting Components and Frame-Style Seal Assembly for Sealing Therebetween and Methods of Assembly and Use Thereof", all of which have a common Assignee as the present application and the entire contents of which are hereby incorporated by reference herein, U.S. Pat. Nos. 5,653,551, 6,511,257, 9,039,325 and U.S. patent application Ser. Nos. 13/780,350 and 14/720,799, and all other patents and patent applications mentioned elsewhere herein, such as to provide a self-contained liquid barrier system around and across the load-supporting surface 16 without the need for any liners below or adjacent to the load-supporting surface 16.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. Apparatus for forming a liquid-tight seal across gaps formed between adjacent components of a load-supporting surface useful at an outdoor worksite, the load-supporting surface being designed to support the weight of people, vehicles and equipment thereupon, the apparatus comprising:

at least first and second mats arranged and adapted to be positioned adjacent to one another and releasably interconnected in the load-supporting surface, each said mat being configured to support the weight of people, vehicles and equipment thereupon and undergo movement relative to one or more other said mats without disengaging from the load-supporting surface, each said mat having an upper surface, at least a first side and an outer edge extending along said first side, each said mat further including an elongated channel formed in said upper surface thereof and disposed proximate to and extending at least partially along said outer edge thereof, wherein when said first side of said first mat is positioned adjacent to said first side of said second mat in the load-supporting surface, a gap is formed between said adjacent outer edges of said respective first sides of said first and second mats; and a liquid-impermeable, elongated seal member arranged and adapted to form a seal between said first and second mats across said gap to prevent the entry of liquid into said gap from said upper surfaces of said first and second mats, said elongated seal member being configured to be coupled to said respective elongated channels of said first and second mats, sealingly engage each of said first and second mats at one or more locations on each said respective mat other than said outer edge thereof and extend across said gap, said seal member being configured to move within said gap in response to movement of at least one of said mats without said seal member losing its sealing engagement with said first and second mats or disengaging from said elongated channels thereof.

2. The apparatus of claim 1 wherein said elongated seal member extends across said gap proximate to said respective upper surfaces of said first and second mats and further wherein said elongated seal member does not entirely fill said gap.

3. The apparatus of claim 1 wherein said elongated seal member includes an elongated central body and first and second elongated legs extending outwardly therefrom on opposite sides thereof, said central body being configured to extend at least partially into and be configured to bend and flex within said gap.

4. The apparatus of claim 3 wherein each said mat includes at least one elongated recess formed in said upper surface thereof around said elongated channel, each said recess being configured to receive and sealing engage one of said legs of said seal member and position said associated leg flush with or below said upper surface of said respective mat, further wherein said central body of said elongated seal member extends downwardly relative to said legs and into said gap.

5. The apparatus of claim 3 further including at least one elongated retainer secured within each said elongated channel and configured to receive and engage a portion of one of said legs of said seal member.

6. The apparatus of claim 5 wherein said retainer has a width that is larger than the width of said associated channel and configured to be friction fit therein.

7. The apparatus of claim 5 wherein said first and second legs of said elongated seal member each include at least one elongated dart extending downwardly therefrom, said dart of said first leg being configured to engage said retainer disposed within said elongated channel of said first mat and said dart of said second leg being configured to engage said retainer disposed within said elongated channel of said second mat.

8. The apparatus of claim 7 wherein each said elongated dart of each said leg includes an elongated, downwardly-extending neck, said neck including at least one elongated protrusion extending outwardly therefrom, said at least one protrusion being spaced downwardly from said associated leg and configured to engage said retainer disposed in said elongated channel of one of said mats.

9. The apparatus of claim 8 wherein each said retainer includes first and second opposing elongated interior side walls surrounding a cavity therebetween and at last one lip extending from one of said side walls into said cavity, said lip being configured to engage at least one of said protrusions of said neck of at least one said dart of one of said legs of said elongated seal member.

10. The apparatus of claim 8 wherein said at least one protrusion is arrow-shaped.

11. The apparatus of claim 8 wherein said at least one protrusion includes first and second elongated, spaced-apart fingers extending outwardly from opposing sides of said neck.

12. The apparatus of claim 11 wherein each said interior side wall of said retainer includes first and second lips, each said lip configured to engage one of said fingers of one of said protrusions.

13. The apparatus of claim 3 wherein said central body of said elongated seal member has an accordion shape.

14. The apparatus of claim 3 wherein said central body of said elongated seal member has a U-shaped cross-sectional shape.

15. The apparatus of claim 3 wherein said central body of said elongated seal member includes one or more cut-out portions.

16. Apparatus for forming a liquid-tight seal across gaps formed between adjacent components of a load-supporting surface useful at an outdoor worksite, the load-supporting surface being designed to withstand outdoor environmental conditions at the worksite and support the weight of people, vehicles and equipment thereupon during normal operating conditions, the apparatus comprising:
at least first and second thermoplastic mats arranged and adapted to be positioned adjacent to one another and releasably interconnected in the load-supporting surface, each said mat being configured to withstand outdoor environmental conditions at the worksite, support the weight of people, vehicles and equipment thereupon and move relative to one or more other said mats in the load-supporting surface during normal operating conditions, each said mat having an upper surface, at least a first side and an outer edge extending along said first side, wherein when said first side of said first mat is positioned adjacent to said first side of said second mat in the load-supporting surface, a gap is formed between said adjacent outer edges of said respective first sides of said first and second mats; and
a liquid-impermeable, elongated seal member constructed at least partially of rubber and arranged and adapted to form a seal between said first and second mats across said gap to prevent the entry of liquid into said gap from said upper surfaces of said first and second mats, said elongated seal member having an elongated central body and first and second elongated legs extending outwardly therefrom on opposite sides thereof, said first leg being configured to be sealingly coupled to said first mat at one or more locations on said mat other than said outer edge thereof and said second opposing leg being configured to be sealingly coupled to said second mat at one or more locations on said mat other than said outer edge thereof, said central body being configured to extend across said gap and move relative to said gap in response to movement of at least one of said mats in the load-supporting surface without said seal member losing its sealing engagement with said first and second mats.

17. The apparatus of claim 16 wherein said first leg of said elongated seal member is configured to sealingly engage said upper surface of said first mat and said second leg of said elongated seal member is configured to sealingly engage said upper surface of said second mat.

18. The apparatus of claim 17 wherein said first and second legs of said elongated seal member are sealingly engaged with said upper surfaces of said first and second mats, respectively, with the use of at least one among at least sealing agent, bonding agent, bolt and clip.

19. The apparatus of claim 16 wherein each said mat includes at least one elongated recess formed in said upper surface thereof and disposed proximate to and extending at least partially along said outer edge thereof, each said recess being configured to receive and sealing engage one of said legs of said seal member and position said associated leg flush with or below said upper surface of said respective mat.

20. The apparatus of claim 19 wherein each said mat further includes an elongated channel formed in said elongated recess thereof, each said channel being configured to receive and engage a portion of one of said legs of said seal member.

21. The apparatus of claim 16 wherein each said mat is configured to undergo at least one among geometric changes, expansion, compression and displacement during normal operating conditions of the load-supporting surface and said central body of said seal member is configured to undergo at least one among bending, moving and flexing within said gap upon at last one among the geometric changing, expansion, compression and displacement of at least one among said first and second mats without said seal member disengaging from said respective first and second mats.

22. Method of assembling a load-supporting surface having a liquid-tight seal across gaps formed between adjacent thermoplastic mats thereof, the load-supporting surface being useful at an outdoor worksite and configured to support the weight of people, vehicles and equipment thereupon, the method comprising:
forming an elongated channel in the upper surface of at least first and second thermoplastic mats proximate to an outer edge of at least a first side each respective mat;
positioning each mat adjacent to at least one other mat and releasably interconnecting adjacent mats to form the load-supporting surface, each mat being configured to support the weight of people, vehicles and equipment thereupon and undergo some movement relative to one or more other mats in the load-supporting surface without losing its interconnection with at least one other mat, and, in particular, positioning the first side of the first mat adjacent to the first side of the second mat and releasably interconnecting the first and second mats, forming a gap between the adjacent outer edges of the respective first sides of the first and second mats;
forming a liquid-impermeable, elongated seal member having an elongated central body and first and second elongated legs extending outwardly therefrom on opposite sides thereof;
the first elongated leg of the seal member engaging the elongated channel formed in the first mat and sealingly engaging the first mat at one or more locations on the mat other than the outer edge thereof;

the second elongated leg of the seal member engaging the elongated channel formed in the second mat and sealingly engaging the second mat at one or more locations on the mat other than the outer edge thereof; and the central body of the seal member extending across the gap and moving within the gap in response to movement of at least one of the first and second mats without the sealing member losing its sealing engagement with the first and second mats or disengaging from the elongated channels thereof to provide a seal across the gap formed between the first and second mats.

23. A apparatus for forming a liquid-tight seal between adjacent components of a load-supporting surface useful at an outdoor worksite, the load-supporting surface being designed to support the weight of people, vehicles and equipment thereupon, the apparatus comprising:

at least first, second and third mats arranged and adapted to be positioned adjacent to one another in the load-supporting surface and forming an intersection therebetween, each said mat being configured to support the weight of people, vehicles and equipment thereupon and undergo movement relative to one or more other said mats without disengaging from the load-supporting surface, each said mat having an upper surface, at least first and second sides and a respective outer edge extending along each said side, respectively, wherein when said first side and said associated outer edge of said first mat is positioned adjacent to said first side and said associated outer edge of said second mat and said second sides and said associated outer edges of said first and second mats are positioned adjacent to said first side and said associated outer edge of said third mat, a respective gap is formed between said adjacent outer edges of each said pair of adjacent sides of said first, second and third mats; and a corner seal member configured to provide a seal across said gaps formed between said adjacent outer edges of said adjacent sides of said first, second and third adjacent mats at said intersection thereof, said corner seal member including first, second and third elongated arms joined together at a central junction, said first and second arms being linearly aligned with one another, said third arm perpendicularly intersecting said first and second arms at said central junction, each said arm having an elongated central body and first and second elongated legs extending outwardly therefrom on opposite sides thereof, said central body of said first, second and third arms being joined together at said central junction, said first leg of said first arm being joined to said second leg of said third arm, said second leg of said first arm being joined to said second leg of said second arm and said first leg of said second arm being joined to said first leg of said third arm, said first leg of said first arm and said second leg of said third arm being configured to sealingly engage said first mat, said second leg of each of said first and second arms being configured to sealingly engage said third mat, and said first leg of said second arm and said first leg of said third arm being configured to sealingly engage said second mat, wherein said central body of said first arm extends across said gap formed between said adjacent outer edges of said first and third mats, said central body of said second arm extends across said gap formed between said adjacent outer edges of said second and third mats and said central body of said third arm extends across said adjacent outer edges of said gap formed between said first and second mats.

24. The apparatus of claim 23, further including a plurality of top side seal members, each said top side seal member being sealingly engageable with two of said first, second and third mats and configured to provide a liquid-tight seal across said gap formed between said adjacent outer edges of said adjacent sides of said associated pair of adjacent mats, wherein each said arm of said corner seal member is configured to sealingly engage at least one of said top side seal members in the load-supporting surface.

25. The apparatus of claim 24 wherein each said arm of said corner seal member has a distal end opposite said central junction, further including an extension protruding laterally outwardly from said distal end of each said arm and being configured to sealingly engage one of said top side seal members in the load-supporting surface.

26. The apparatus of claim 25 wherein each said top side seal member includes an elongated central body and first and second elongated legs extending outwardly therefrom on opposite sides thereof, further wherein each said extension is configured to sealingly engage at least a portion of the central body of at least one of said top side seal members.

27. The apparatus of claim 26 wherein each said extension is configured to sealingly engage at least a portion of the first and second legs of at least one of said adjacent top side seal members.

28. Method of assembling a plurality of all-weather, heavy duty, thermoplastic mats useful in a load-supporting surface that includes a plurality of top side seal members, each top side seal member having an elongated central body and first and second legs extending from opposing sides thereof, each leg including at least one dart extending downwardly therefrom, each top side seal member being engageable with at least two adjacent mats and configured to provide a liquid-tight seal across a gap formed between the adjacent mats, the mats each having at least one upper surface, being useful at an outdoor worksite and configured to support the weight of people, vehicles and equipment thereupon, the method comprising:

Providing an elongated channel in the upper surface of at least first and second releasably interconnectable mats proximate to each outer edge of each among four sides of each mat, each channel being formed to a desired depth in the respective mat, each mat being constructed of all-weather, heavy duty, thermoplastic material, being useful at an outdoor worksite and configured to support the weight of people, vehicles and equipment thereupon;

Providing an elongated recess in the upper surface of each of at least the first and second mats around each of the respective channels formed therein to a depth in the respective mat that is shallower than the depth of the respective associated channel, each recess extending from the corresponding outer edge of each mat to a location on the mat inwards of the corresponding channel and configured to seat one of the legs a first top side seal member so that such leg sits at or below the upper surface of the mat; and Securing at least one elongated retainer in each channel of each of at least the first and second mats, each retainer including first and second opposing elongated interior side walls surrounding a cavity disposed therebetween and at least one elongated lip extending into the cavity from one or both of the side walls thereof, at least one lip of each retainer being configured to grip at least one dart of the top side seal member leg seated in the associated recess of the corresponding mat and assist in retaining the leg in position relative to the associated mat, whereby the first mat is configured to engage the first leg of the first top side seal member and the second mat is configured to engage the second leg of the first top side seal member so that the top side seal member will extend between the first and second mats across a gap formed therebetween when the first and second mats are interconnected.

\* \* \* \* \*